July 10, 1945.  S. L. GOLDSBOROUGH  2,380,164
LOOP-TYPE IMPEDANCE-RELAY OR THE LIKE
Filed Sept. 22, 1943
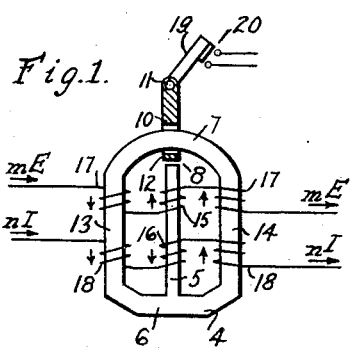
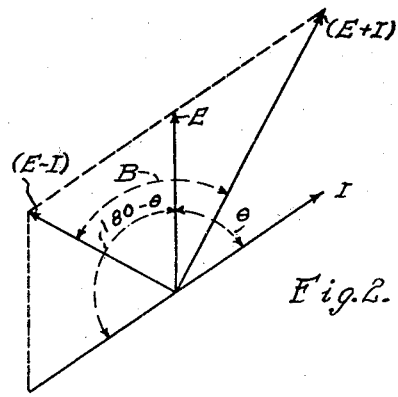
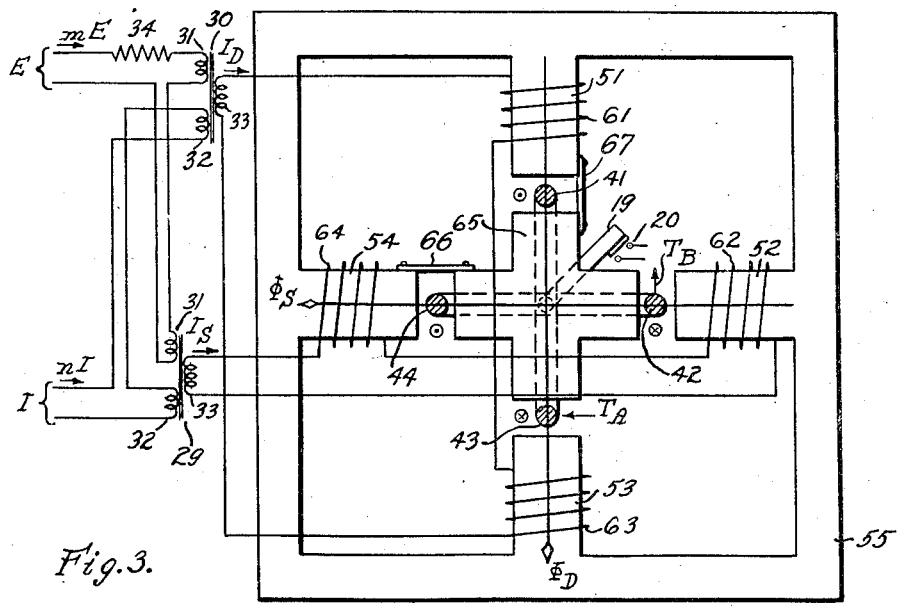
WITNESSES:
INVENTOR
Shirley L. Goldsborough.
BY O. B. Buchanan
ATTORNEY Patented July 10, 1945

2,380,164

UNITED STATES PATENT OFFICE

2,380,164

LOOP-TYPE IMPEDANCE RELAY OR THE LIKE

Shirley L. Goldsborough, Basking Ridge, N. J., assignor to Westinghouse Electric Corporation, East Pittsburgh, Pa., a corporation of Pennsylvania Application September 22, 1943, Serial No. 503,367

11 Claims. (Cl. 175—294)

My present invention relates to improvements in distance-measuring relays, and it provides a basis for a universal high-speed relay-element which, by proper control of the design-constants, can be made to perform any relay-function, such as impedance, reactance, resistance, directional, differential, or overcurrent relays, and other types of relays.

A particular object of my invention is to provide a distance-measuring effect, or in general, any differential comparison of any two electrical quantities, one against the other, in a wattmetric or directional-type relay, and particularly in a loop-type relay which effects a multiplication of two electrical quantities.

Heretofore, distance-type relay-elements have been constructed so that opposing forces are applied to a beam, pivoted at its center. There are certain disadvantages which have been experienced with this type of construction, which has been in standard use for a good many years. The beam-type relay has been subject to change in calibration, because of slight changes in the initial or reset position of the beam. At the balance-point, heavy forces are mechanically balanced against each other through a bearing. The beam-type element does not lend itself well to perform other functions, such as directional responses, reactance-responses, and many others.

It is a particular object of my invention to accomplish the functions which were formerly obtained on a balanced beam, by now using a process of multiplication, in a directional element, wherein the polarized coil may be energized, for example, with the quantity $(E+I)$, and the field-coil may be energized, for example, with the quantity $(E-I)$. The action of a directional element is to multiply its polarizing and field-coil quantities, obtaining a force which is proportional, for example, to $(E+I)(E-I)$. By a proper control of the design-constants of the E and I quantities in both terms, I can make the relay respond to $E^2-I^2=0$, which is an impedance-response, or by proper change in the constants, practically all other kinds of relay-responses may be obtained.

With the foregoing and other objects in view, my invention consists in the apparatus, combinations, systems, parts and methods hereinafter described and claimed, and illustrated, in the accompanying drawing, wherein:

Figure 1 is a diagrammatic plan-view of a loop-type distance-relay of my invention, shown with the loop in section, Fig. 2 is a vector diagram which will be referred to in the explanation, and Fig. 3 is a diagrammatic view of circuits and apparatus illustrating a different form of embodiment of the invention.

My present invention may be applied to any kind of directional or product-responsive relay. I have illustrated it, and I at present prefer to use it, however, in connection with a directional relay of the loop-type, in which the movable element is simply a loop or a plurality of loops, which may be extremely light in weight, for any given torque, resulting in a small, lightweight relay having a high speed of action. Where such qualities, particularly the high speed of operation, are not desired, the invention may be applied to other, slower-acting types of directional or wattmetric relays.

The basic design of the relay-structure may be the same as, or improvements on, any known form of loop-type relay, such as that which is shown in a Patent 2,300,866 of Bert V. Hoard and myself, granted November 3, 1942, or in any one of three copending applications of myself and others, Serial Nos. 503,366, 504,696, and 516,238, filed September 22, 1943, October 2, 1943, and December 30, 1943, respectively.

In Fig. 1, I have illustrated my invention in the form of a relay-element which is structurally like that which is shown in my aforesaid Patent No. 2,300,866. It may be either a single-phase or a polyphase element. I have illustrated it as a single-phase element or unit, in Fig. 1 of the accompanying drawing, wherein a closed ring 4 of laminated magnetic material is provided, having a reentrant portion or pole-piece 5 which extends, from the back side 6 of the relay-frame 4, toward the front side 7 thereof, being spaced from the front arm or leg 7 of the relay, by an airgap 8. The front arm or leg 7 of the relay-frame is threaded through the hole of a loop 10, which is pivoted, off to one side, at a pivot-point 11, so that the loop is free to swing, and to move back and forth for a short distance along the front leg 7, without touching the same, so that a coil-side 12 of the loop may be within the airgap 8.

This type of element has two magnetic circuits, which are traversed by two different alternating-current fluxes. One of these fluxes flows through the central leg or pole-piece 5 and across the airgap 8, and then divides, half of said flux returning through each of the side-legs 13 and 14 of the field-frame 4. The other magnetic flux circulates back and forth around the outer ring or yoke of the magnetic frame 4, for instance moving forwardly along the side-arm 14, to the left across the front arm 7, back along the other side-arm 13, and to the right along the back arm 6, to its starting-point.

According to my present invention, both current-excitation and voltage-excitation are utilized for one or both of these two magnetic circuits of the relay. In the general case, as illustrated in Fig. 1, current- and voltage-responsive excitation is utilized on both of the magnetic circuits. Thus the central leg or pole-piece 5 is provided with both a voltage-coil 15 and a current-coil 16, energizing one of the magnetic circuits. In like manner, the two outer legs 13 and 14 are each provided with a voltage-coil 17 and a current-coil 18, to energize the other magnetic circuit of the relay. The three voltage-coils 15, 17 are shown as being connected in series with each other, and energized with a voltage-responsive exciting-current $mE$, although other forms of energization may be utilized. The three current-coils 16, 18 are in like manner illustrated as being connected together in series and energized with a current-responsive exciting-current $nI$. The polarities of the coils are such that the outer legs, or the loop-circuit of the magnetic frame-member 4, are excited in accordance with a function of $(E+I)$, while the central leg or pole-piece 5 is energized in response to a function of the quantity $(E-I)$.

The outer-leg flux, which is responsive to $(E+I)$ in Fig. 1, induces a current in the loop 10, and this current, flowing in the loop-side 12, reacts with the airgap-flux which is responsive to $(E-I)$, to produce a torque which, with suitable constants or measuring-units, is equal to the product $(E+I)(E-I)$. This torque, when in the proper direction, actuates the relay, causing it to move its movable contact-arm 19 into engagement with the stationary relay-contacts 20, for controlling any relaying-circuit which is to be controlled by my relay.

The magnetizing force or exciting ampere-turns of the various relay-coils 15, 16, 17 and 18, in Fig. 1, need not all be the same. In general, we may write the equation for the torque, $$T=(K_1E+K_2I)(K_3E-K_4I) \qquad (1)$$

where $K_1$, $K_2$, $K_3$ and $K_4$ are design-constants. If $\theta$ is the angle between E and I, this product-torque may be multiplied out to obtain $$T=K_1K_3E^2+K_2K_3EI\cos\theta-K_1K_4EI\cos\theta-K_2K_4I^2 \qquad (2)$$

If we make $K_1=K_3$ and $K_2=K_4$, the cosine terms cancel out, and we have a torque which is responsive to $K_1^2E^2-K_2^2I^2$. At the balance point of the relay, this torque is zero, and we have $$K_1^2E^2=K_2^2I^2 \qquad (3)$$

$$\frac{E}{I}=Z=\frac{K_2}{K_1} \qquad (4)$$

which is a response to the apparent or measured line-impedance $Z=E/I$.

If we had omitted, altogether, the voltage-coil 15 on the central leg 5 of the relay, in Fig. 1, making $K_3=0$, and if we had introduced a 90° phase-shifter so that the phase-angle between E and I is $(\theta+90)$ instead of $\theta$, we would have obtained a balance-point of the relay at $$K_1K_4EI\sin\theta-K_2K_4I^2=0 \qquad (5)$$

$$\frac{E\sin\theta}{I}=X=\frac{K_1}{K_2} \qquad (6)$$

which is a response to the apparent or measured line-reactance X.

Any sort of compromise-characteristic, between impedance, reactance, or resistance, can be obtained, as can be seen from Equation 2, by the proper selection of the K constants, so that the cosine terms do not cancel out entirely. Or, by putting only a voltage-response on one magnetic circuit, and only a current-response on the other, as by making $K_2=K_3=0$, we may obtain a conventional directional response, $K_1K_4EI\cos\theta$, or by introducing any phase-angle S by means of a phase-shifter, we can make the response $K_1K_4EI\cos(\theta+S)$.

In general, any values at all may be assigned to the constants $K_1$, $K_2$, $K_3$ and $K_4$, and any phase-angle relationship may be maintained between E and I. Also a different pair of E and I, with different phase-angle relationships, may be utilized on the two different magnetic circuits of the relay, as explained, for example, in my copending application, Serial No. 504,695, filed October 2, 1943. In other words, I have provided a conventional product-responsive relay, which is essentially a directional or wattmetric element, and by proper choice of constants I have been enabled to obtain a response to the difference between two electrical quantities, either independently of the phase-angles between those quantities, or with any variation between a non-directional difference-response and a full-directional or wattmetric response.

Fig. 2 shows a vector diagram which brings out pictorially the action which takes place in a directional element in which the constants are chosen so that the element operates as an impedance-element. The current vector I is made equal to the voltage vector E, lagging behind it by any angle $\theta$. The polarizing coil, for instance, receives $(E+I)$, and the field-coil $(E-I)$. These quantities are shown in Fig. 2. An inspection of Fig. 2 reveals that the angle B between the $(E+I)$ quantity and the $(E-I)$ quantity is given by $$B=\frac{\theta}{2}+\frac{180-\theta}{2}=90° \qquad (7)$$

In other words, the angle between the two quantities which the relay multiplies is always 90°, regardless of the phase-angle $\theta$ between E and I. If the relay is designated to have a true watt-characteristic, so that it responds to the product of its two magnetizing forces times the cosine of the angle B between them, the relay will have a zero torque, and Fig. 2 will represent the balance-point of the relay, regardless of the values of the angle $\theta$ between E and I.

For a fault which is closer to the relay than the conditions depicted in Fig. 2, the E-vector will be shorter, and it can be seen that this will cause the angle B to become greater than 90°, which will produce a torque to close the contacts of the relay. A fault which is beyond the balance-point depicted in Fig. 2 will cause B to become less than 90°, producing a contact-opening torque.

This principle of operation is quite general, and it can be applied to any directional or wattmetric relay-element, in which the torque is the product of two electrical quantities, whether a current and voltage, or two currents, or any other combination of two different electrical quantities of a given frequency. In particular, in accordance with my present invention, I am enabled to apply it to a high-speed loop-type product-element, in order to obtain a distance-responsive relay which can perform all of the functions which may be required of any distance-relay, or modified-distance or reactance-relay, etc., by merely changing the coil-constants.

In Fig. 3, I illustrate certain ways in which the construction and control may be varied. For example, instead of utilizing a current-coil and a voltage-coil on each magnetic circuit of the relay, and applying separate current-responsive and voltage-responsive excitations to the two coils, I can utilize a three-winding transformer 29 for combining the voltage and current-responses to obtain a secondary current Is which is proportional to the sum $(E+I)$, and another three-winding transformer 30 for producing a secondary current ID which is proportional to the difference $(E-I)$, as described in my aforesaid copending application Serial No. 504,695. Each of these three-winding transformers 29 and 30 may have a voltage-responsive primary winding 31, a current-responsive primary winding 32 and a secondary winding 33, the voltage-responsive winding being excited through an impedance 34 which is large in comparison to the magnetizing impedance of said winding, so as not to interfere with the flux-changes in the transformer-ion due to the current coil 32.

In Fig. 3, I have also illustrated the fact that two loop-torque responses may be utilized, having the double-frequency, pulsating components of their torques exactly equal and opposite to each other, so that the resultant torque is a constant steady or non-pulsatory torque, for any given magnitude of E and I and for any given value of the phase-angle between them. To this end, I have illustrated, in Fig. 3, a form of relay-construction which is described and claimed in my aforesaid copending application Serial No. 516,238, in which two loops A and B are utilized, disposed at right angles to each other, or in space-quadrature relation, and having their several loop-sides 41, 42, 43 and 44 disposed in air gaps under four poles 51, 52, 53 and 54, of a laminated magnetizable frame or yoke 55.

One of the magnetic fluxes, which I have designated $\phi_D$, passes in a straight line diametrically across the instrument or through points 180 electrical degrees apart, through the poles 51 and 53, under the excitation of coils 61 and 63 which are excited with the difference-current $\phi_D=(E-I)$, as supplied by the three-winding transformer 30. The other magnetic flux, marked $\phi_S$, extends diametrically across the instrument, through the other poles 52 and 54, which are excited by coils 62 and 64 which are energized with the sum-current $I_S=(E+I)$, which is supplied by the other three-winding transformer 29. The magnetic circuit, inside of the loops A and B, may be completed, either in air, or preferably through a magnetizable member 65, which I have illustrated diagrammatically as a stationary member which is supported from suitable insulating supporting-pieces 66 and 67.

The result of the relay-structure shown in Fig. 3 is that the loop A is excited with a loop-current which is induced by the summation-flux $\phi_S$, and this loop-current reacts with the differential flux $\phi_D$ to produce a clockwise torque $T_A$. The current in the loop B is induced by the differential flux $\phi_D$, and it reacts with the summation-flux $\phi_S$ in the airgaps under the poles 52 and 54, producing a counterclockwise torque $T_B$. It can be readily shown that the double-frequency pulsating components of these two torques $T_A$ and $T_B$ exactly cancel each other, when the torques are added algebraically, so that the total resultant torque of the relay is a steady quantity, lacking the double-frequency torque-pulsations which are the characteristic of all single-torque, single-phase product-responsive relays, as well as simple beam-type relays.

The broad concept of a wattmeter-type device in which one of the fluxes which are multiplied is a flux having a current-responsive component and a voltage-responsive component is described and claimed in an application of Bert V. Hoard, Serial No. 456,901, filed September 1, 1942, and assigned to the Westinghouse Electric & Manufacturing Company.

While I have illustrated my invention in certain particular structural forms, and while I have described its general principles of operation, as well as certain specific choices of the various design-constants, I wish it to be understood that I am not limited to the precise structures, circuits, combinations, or choices of relative design-constants which I have chosen for illustration. I desire, therefore, that the appended claims shall be accorded the broadest construction consistent with their language and the prior art.

I claim as my invention:

1. A substantially non-vibratory, product-responsive, single-phase, torque-producing relay-element adapted for use on an alternating-current system and comprising a stator member and a rotor member, one of said members comprising four successive windings of an electrically excited magnetizable element, the other of said members comprising two mechanically connected loops A and B, first- and third-winding exciting-means of said electrically excited magnetizable element for causing one alternating flux to enter at one loop-side of loop A and leave at the other loopside of loop A, interlinking through loop B in the process, and second- and fourth-winding exciting-means of said electrically excited magnetizable element for causing another alternating flux to enter at one loop-side of loop B and leave at the other loop-side of loop B, interlinking through loop A in the process, the exciting-means which produces at least one of said fluxes being responsive to the vectorial sum of an alternating-current function of a line-current and an alternating-current function of a line-voltage.

2. A substantially non-vibratory, product-responsive, single-phase, torque-producing relay-element adapted for use on an alternating-current system and comprising a stator member and a rotor member, one of said members comprising four successive windings of an electrically excited magnetizable element, the other of said members comprising two mechanically connected loops A and B, first- and third-winding exciting-means of said electrically excited magnetizable element for causing one alternating flux to enter at one loop-side of loop A and leave at the other loop-side of loop A, interlinking through loop B in the process, and second- and fourth-winding exciting-means of said electrically excited magnetizable element for causing another alternating flux to enter at one loop-side of loop B and leave at the other loop-side of loop B, interlinking through loop A in the process, the exciting-means which produces one of said fluxes being responsive to the vectorial sum of an alternating-current function of a line-current and an alternating-current function of a line-voltage, and the exciting-means which produces the other flux being responsive to a different vectorial sum of an alternating-current function of a line-current and an alternating-current function of a line-voltage.

3. A substantially non-vibratory, product-responsive, single-phase, torque-producing relay-element adapted for use on an alternating-current system and comprising a stator member and a rotor member, one of said members comprising an electrically excited magnetizable element having four exciting-winding means symmetrically disposed in two pairs of diametrically opposite means, the other of said members comprising two mechanically connected loops A and B disposed at substantially right angles to each other and having their four loop-sides disposed near the center-lines of the respective exciting-winding means of the electrically excited magnetizable members, and two supply-circuit means for the respective pairs of diametrically opposite means, whereby two fluxes are caused to flow diametrically across the relay-element, in the two diameters, at least one of said supply-circuit means being responsive to the vectorial sum of an alternating-current function of a line-current and an alternating-current function of a line-voltage.

4. A substantially non-vibratory, product-responsive, single-phase, torque-producing relay-element adapted for use on an alternating-current system and comprising a stator member and a rotor member, one of said members comprising an electrically excited magnetizable element having four exciting-winding means symmetrically disposed in two pairs of diametrically opposite means, the other of said members comprising two mechanically connected loops A and B disposed at substantially right angles to each other and having their four loop-sides disposed near the center-lines of the respective exciting-winding means of the electrically excited magnetizable members, and two supply-circuit means for the respective pairs of diametrically opposite means, whereby two fluxes are caused to flow diametrically across the relay-element, in two diameters, one of said supply-circuit means being responsive to the vectorial sum of an alternating-current function of a line-current and an alternating-current function of a line-voltage, and the other supply-circuit means being responsive to a different vectorial sum of an alternating-current function of a line-current and an alternating-current function of a line-voltage.

5. A substantially non-vibratory single-phase torque-producing electro-responsive device adapted for use on an alternating-current system and comprising a movable member having a rotor-member comprising two symmetrically disposed loops at substantially right angles to each other, with one loop inside of the other, a magnetizable field-member having four salient poles coinciding with the respective loop-sides, an exciting-coil means on each pole, and two different energizing-means whereby two diametrically opposite poles carry one alternating flux and the other two diametrically-opposite poles carry another alternating flux, at least one of said energizing-means being responsive to the vectorial sum of an alternating-current function of a line-current and an alternating-current function of a line-voltage.

6. A substantially non-vibratory single-phase torque-producing electro-responsive device adapted for use on an alternating-current system and comprising a movable member having a rotor-member comprising two symmetrically disposed loops at substantially right angles to each other, with one loop inside of the other, a magnetizable field-member having four salient poles coinciding with the respective loop-sides, an exciting-coil means on each pole, and two different energizing-means whereby two diametrically opposite poles carry one alternating flux and the other two diametrically opposite poles carry another alternating flux, one of said energizing-means being responsive to the vectorial sum of an alternating-current function of a line-current and an alternating-current function of a line-voltage, and the other energizing-means being responsive to a different vectorial sum of an alternating-current function of a line-current, and an alternating-current function of a line-voltage.

7. A substantially non-vibratory single-phase torque-producing electro-responsive device comprising a movable member having a rotor-member comprising two symmetrically disposed loops at substantially right angles to each other, with one loop inside of the other, a magnetizable field-member having four salient poles coinciding with the respective loop-sides, an exciting-coil means on each pole, and two different energizing-means whereby two diametrically opposite poles carry one alternating flux and the other two diametrically opposite poles carry another alternating flux, one of said energizing-means being responsive to $(E+I)$ and the other being responsive to $(E-I)$, where E and I represent any two alternating flux-producing forces, each compounded of a constant times a single-phase exciting-current, the two exciting-currents being relatively variable, both as to phase and magnitude, with respect to each other.

8. A substantially non-vibratory, product-responsive, single-phase, torque-producing relay-element adapted for use on an alternating-current system and comprising a stator member and a rotor member, one of said members comprising four successive windings of an electrically excited magnetizable element, and four winding-exciting means for said four successive windings, the first- and third-winding exciting-means producing one alternating flux, the second- and fourth-winding exciting-means producing a space-quadrature-related alternating flux, the other of said members comprising a conducting secondary member traversed by said two space-quadrature-related alternating fluxes and so disposed that each flux enters and leaves the conducting secondary member at points approximately 180 electrical degrees apart and thereby induces a circulating secondary current which flows in a path or paths having a torque-producing relation with the other flux, each flux interlinking through the path or paths of the circulating secondary current which it induces, the exciting-means which produces one of said fluxes being responsive to the vectorial sum of an alternating-current function of a line-current and an alternating-current function of a line-voltage, and the exciting-means which produces the other flux being responsive to a different vectorial sum of an alternating-current function of a line-current and an alternating-current function of a line-voltage.

9. A substantially non-vibratory, product-responsive, single-phase, torque-producing relay-element adapted for use on an alternating-current system and comprising a stator member and a rotor member, one of said members comprising an electrically excited magnetizable element having four exciting-winding means symmetrically disposed in two pairs of diametrically opposite means, and two supply-circuit means for the respective pairs of diametrically opposite means, whereby two fluxes are caused to flow diametrically across the relay-element, in the two diameters, the other of said members comprising a conducting secondary member traversed by said two fluxes and so disposed that each flux enters and leaves the conducting secondary member at approximately diametrically opposite points and thereby induces a circulating secondary current which flows in a path or paths having a torque-producing relation with the other flux, each flux interlinking through the path or paths of the circulating secondary current which it induces, one of said supply-circuit means being responsive to the vectorial sum of an alternating-current function of a line-current and an alternating-current function of a line-voltage, and the other supply-circuit means being responsive to a different vectorial sum of an alternating-current function of a line-current and an alternating-current function of a line-voltage.

10. A substantially non-vibratory single-phase torque-producing electro-responsive device adapted for use on an alternating-current system and comprising a movable member having a conducting secondary rotor-member, a magnetizable field-member having four salient poles approximately uniformly spaced around said rotor-member, an exciting-coil means on each pole, and two different energizing-means whereby two diametrically opposite poles carry one alternating flux and the other two diametrically opposite poles carry another alternating flux, said conducting secondary rotor-member being traversed by said two fluxes and so disposed that each flux enters and leaves the conducting secondary rotor-member at approximately diametrically opposite points and thereby induces a circulating secondary current which flows in a path or paths having a torque-producing relation with the other flux, each flux interlinking through the path or paths of the circulating secondary current which it induces, one of said energizing-means being responsive to the vectorial sum of an alternating-current function of a line-current and an alternating-current function of a line-voltage, and the other energizing-means being responsive to a different vectorial sum of an alternating-current function of a line-current and an alternating-current function of a line-voltage.

11. A substantially non-vibratory single-phase torque-producing electro-responsive device comprising a movable member having a conducting secondary rotor-member, a magnetizable field-member having four salient poles approximately uniformly spaced around said rotor-member, an exciting-coil means on each pole, and two different energizing-means whereby two diametrically opposite poles carry one alternating flux and the other two diametrically opposite poles carry another alternating flux, said conducting secondary rotor-member being traversed by said two fluxes and so disposed that each flux enters and leaves the conducting secondary rotor-member at approximately diametrically opposite points and thereby induces a circulating secondary current which flows in a path or paths having a torque-producing relation with the other flux, each flux interlinking through the path or paths of the circulating secondary current which it induces, one of said energizing-means being responsive to $(E+I)$ and the other being responsive to $(E-I)$, where E and I represent any two alternating flux-producing forces, each compounded of a constant times a single-phase exciting-current, the two exciting-currents being relatively variable, both as to phase and magnitude, with respect to each other.

SHIRLEY L. GOLDSBOROUGH.